United States Patent [19]
Torii et al.

[11] 4,347,338
[45] Aug. 31, 1982

[54] PROCESS FOR PREPARING THERMOSETTABLE POLYURETHANE WHICH COMPRISES BLENDING A POLYISOCYANATE WITH A FIRST THERMOPLASTIC RESIN AND THEN BLENDING WITH A SECOND THERMOPLASTIC RESIN WHICH IS A POLYURETHANE

[75] Inventors: Hideyasu Torii, Kawagoe; Susumu Nakamura, Kawaguchi, both of Japan

[73] Assignees: Dainichiseika Color & Chemicals Mfg. Co., Ltd.; Ukima Colour & Chemicals Mfg. Co., Ltd., both of Tokyo, Japan

[21] Appl. No.: 265,244

[22] Filed: May 19, 1981

[30] Foreign Application Priority Data

May 29, 1980 [JP]  Japan ................................. 55-70860

[51] Int. Cl.³ ............................................. C08L 75/04
[52] U.S. Cl. .................................... 525/123; 525/127; 525/129; 525/130; 525/399; 525/440; 525/457
[58] Field of Search ............... 525/123, 127, 129, 130, 525/399, 440, 457

[56] References Cited

U.S. PATENT DOCUMENTS 4,048,253  9/1977  Ooba et al. .......................... 525/440

Primary Examiner—Maurice J. Welsh
Attorney, Agent, or Firm—Oblon, Fisher, Spivak, McClelland & Maier

[57] ABSTRACT

A thermosettable polyurethane product is prepared by blending a compound having two or more terminal isocyanate groups to a thermoplastic resin which is inert to said isocyanate group to prepare an isocyanate compound batch, and further blending the isocyanate compound batch to a thermoplastic polyurethane resin and fabricating the resulting mixture.

5 Claims, No Drawings

PROCESS FOR PREPARING THERMOSETTABLE POLYURETHANE WHICH COMPRISES BLENDING A POLYISOCYANATE WITH A FIRST THERMOPLASTIC RESIN AND THEN BLENDING WITH A SECOND THERMOPLASTIC RESIN WHICH IS A POLYURETHANE

BACKGROUND OF THE INVENTION

1. Field of the Invention

The present invention relates to a process for preparing a thermosettable polyurethane product which can be effectively obtained.

2. Description of the Prior Art

Thermoplastic polyurethane elastomers have relatively high hardness over the other elastomers as well as excellent elasticity, tensile strength and oil resistance. In view of such characteristics, thermoplastic polyurethane elastomers have been used in various fields. Thermoplastic polyurethane elastomers, however, have substantially linear structures whereby they are easily soluble in polar solvents. Moreover, thermoplastic polyurethane elastomers have large regenerative property in continuous repeating frictions whereby the friction contacting parts are disadvantageously heat-melted. It has been known to desire a crosslinking structure in the molecule of the polyurethane elastomer in order to overcome these disadvantages.

The following procedures have been proposed as the processes for forming crosslinked polyurethane elastomers having high quality.

(1) As it is found in a casting process, a crosslinked polyurethane elastomer is produced by reacting, a linear polyester or polyether having hydroxyl groups with an excess of an organic diisocyanate to be required for the reaction with hydroxyl groups.

(2) A crosslinked polyurethane elastomer is produced by mixing a solution of a crosslinking agent having 3 or 4 functional terminal NCO groups in a solvent to a solution of a substantially linear polyurethane in a solvent and coating the mixture on a parting paper or impregnating the mixture in a fabric and evaporating the solvent in a dryer.

In the process (1), high technique under long experience and high skill is required and accordingly, the process (1) is not suitable for a continuous fabrication for preparing electric wires and tubes by an extrusion. In the process (2), a solvent is used and accordingly, the process (2) is not suitable for preparing a small size fabricated product except it is prepared by a coating process.

SUMMARY OF THE INVENTION

It is an object of the present invention to provide a process for preparing a thermosettable polyurethane product without using a solvent.

The foregoing and other objects of the present invention have been attained by providing a process for preparing a thermosettable polyurethane product which comprises blending a compound having two or more terminal isocyanate groups to a thermoplastic resin which is inert to an isocyanate group to prepare an isocyanate compound batch and further blending the isocyanate compound batch to a thermoplastic polyurethane resin and fabricating the resulting mixture.

DETAILED DESCRIPTION OF THE PREFERRED EMBODIMENTS

The inventors have studied to overcome disadvantages of conventional crosslinked polyurethane elastomers. As a result, it has been found that a thermosettable polyurethane product is obtained by blending a compound having two or more terminal isocyanate groups to a thermoplastic resin which is not reactive with an isocyanate group and substantially has not water absorbability and is miscible to a thermoplastic polyurethane, and further blending the mixture to a thermoplastic polyurethane resin and melt-kneading the resulting mixture by an extrusion molding machine, an injection molding machine or a mixing roll machine etc. to crosslink them by reactions of hydroxyl groups, amino groups, urethane bonds or urea bonds in the thermoplastic polyurethane with isocyanate groups. The present invention has been attained by the finding.

In the present invention, the crosslinkages are given by allophanate bonds formed by hydrogen atoms of urethane bonds of the thermoplastic polyurethane with isocyanate groups and Biuret bonds formed by hydrogen atoms of urea bonds of the thermoplastic polyurethane with isocyanate groups. The technology for utilizing has been disclosed in West German Pat. No. 831772 and Japanese Unexamined Patent Publication No. 20293/1972. In the prior art, a chain extension through urethane group results in the first step and an allophanate is formed with a hydrogen atom of an urethane group in the second step to contribute to the intermolecular crosslinkage. It is almost impossible to apply said process using thermoplastic polyurethane resins in a conventional formulation in an extrusion molding or injection molding process.

In accordance with the present invention, an isocyanate batch is mixed with a thermoplastic polyurethane resin and the mixture is fabricated by an extrusion molding machine or an injection molding machine to easily obtain a thermosettable polyurethane product.

The isocyanate batch is formed by blending a compound having two or more terminal isocyanate groups with a thermoplastic resin which is not reactive with an isocyanate group and has not water absorbability and is miscible to a thermoplastic polyurethane resin.

Suitable thermoplastic resins for forming the batch with the compound having terminal isocyanate groups, include polyvinyl chloride resins, polystyrene resins, acryl resins, ABS resins, ester rubbers, polyethyleneterephthalate, polyethylene, polypropylene, polyacetal, polycarbonate, difluoroethylene resins, tetrafluoroethylene resins, etc.

Suitable compounds having two or more terminal isocyanate groups include aromatic diisocyanates such as 2,4-tolylenediisocyanate, 2,6-tolylenediisocyanate, a mixture thereof, 4,4'-diphenylmethanediisocyanate, m-phenylenediisocyanate, 1,5-naphthalenediisocyanate and 4,4'-biphenyldiisocyanate; aliphatic diisocyanates such as tetramethylenediisocyanate, hexamethylenediisocyanate and octamethylenediisocyanate; other aromatic diisocyanates such as xylylenediisocyanate; and triisocyanates such as 4,4',4''-triphenylmethanetriisocyanate, 2,4,4'-biphenyltriisocyanate and 2,4,4'-diphenylmethanetriisocyanate. The other isocyanate compounds which can be used are adducts having two or more isocyanate groups obtained by reacting said di- or tri-isocyanate with a compound having two or more hydroxyl groups such as diols and triols or polymers of said isocyanate compound.

In order to blend the compound having two or more terminal isocyanate groups to the thermoplastic resin, 5 to 100 wt.part of the isocyanate compound is mixed with 100 wt.part of the thermoplastic resin and the mixture is well kneaded at 130° to 250° C. in a mixing roll mill or Banbury mixer and cooled and ground by a crusher to prepare the isocyanate batch.

As an alternative procedure, the isocyanate compound and the thermoplastic resin are mixed by a high speed mixing process in a Henschel mixer and the mixture is extruded by an extruder and is pelletized to obtain the isocyanate batch in a form of pellets. If the isocyanate compound is added to the thermoplastic polyurethane without the preparation of the batch, a slip phenomenon is caused in a cylinder of an extrusion molding machine or an injection molding machine because of differences of the melting points or differences of molten viscosities of the components. Thus, it is difficult to attain desired quantitative kneading. In the case of the roll milling process, it is also difficult to attain a desired kneading in the slip phenomenon on the roll surfaces because of difference of the melting points and difference of molten viscosities.

In accordance with the process of the present invention, it is possible to use liquid isocyanate compounds as well as solid isocyanate compounds. When the isocyanate batch is added to the thermoplastic polyurethane resin, an amount of the isocyanate batch is in a range of 1 to 100 wt.parts preferably 5 to 40 wt.parts per 100 wt.parts of the thermoplastic polyurethane resin.

When a constant of the isocyanate batch is too small, the crosslinking effect is not enough whereas when it is too much, the unreacted NCO groups cause a coloring phenomenon for the fabricated product. These are disadvantageous.

When the isocyanate batch is added to the thermoplastic polyurethane resin and the mixture is molded by a molding machine to prepare a thermosettable polyurethane product, it is usual to use the thermoplastic polyurethane resin in a form of pellets or beads, and the isocyanate batch is added to the thermoplastic polyurethane resin and the mixture is well tumbled by a tumbler and then it is molded by a molding machine such as an injection molding machine, an extrusion molding machine and a roll machine to prepare the objective products. A temperature in the molding operation is depending upon a kind of the thermoplastic polyurethane resin and is usually in a range of 120° to 210° C.

The molded product obtained by the process of the present invention is soft just after the molding operation, because a crosslinking reaction is not highly performed. The crosslinking reaction is completed by ageing at 100° C. for 2 hours after the molding to obtain a product having low heat-deformation and excellent solvent resistance.

In accordance with the process of the present invention, various advantages are attained, for example, it is suitable for a mass production of small size molded products as an advantage of an injection molding process; it to reduce a loss of the materials in the molding operation for preparing the products; complicatedly shaped products can be easily molded; a product can be prepared in a continuous form by an extrusion molding process to obtain a continuous molded product having a constant sectional view in a non-hollow or hollow form depending upon the shape of a die and various extrusion molded products can be easily obtained.

The molded products prepared by the process of the present invention include ball joints, bushes, dust covers, shock absorbers, brake stoppers, O-rings, oil feed rings, spacers for plate spring, doorlock strikers, gears, packings, seals, plates, pickers, KP holders, urethane bolls, casters, washers, parts for tuners, hydrants, soles of shoes for sport, lifts, heel tops, grips for skii, sprockets for snow mobile, caterpillars, soles of military shoes and safety shoes, golf balls, belts, gaskets, plugs and sockets which are prepared by an injection molding process; and conveyer belts, water containers, tanks for brewing, flexible containers and motor oil container, which are prepared by an extrusion molding process; and boiling bags, sheets for transferring powder or grain, covers, cloth and tapes which are prepared by a film extrusion process; products prepared by an inflation process; tubes and hoses prepared by a tube extrusion process; underground cables, submarine cables, power-communication cables, lead wires, computer wirings, automobile wirings and enamel wires which are prepared by a coating extrusion process; and belts prepared by a belt extrusion process; bags, packages, laminated products, covers, agricultural houses, belts synthetic lathers, flexible containers which are prepared by a calender process as a roll process; and packages and bags prepared by a hollow molding process.

In the specification, the term "molding" means broad meanings including an extrusion molding, an injection molding, a film extrusion, an inflation, a tube extrusion, a coating extrusion, a belt extrusion, a roll molding and a hollow molding.

The present invention will be illustrated by certain examples and references which are provided for purposes of illustration only and are not intended to be limiting the invention. In the examples, the term of "parts" means "part by weight."

EXAMPLE 1

A mixture of 100 wt.parts of dried plasticized polyvinyl chloride resin pellets (plasticizer of dioctylphthalate 50 PHR) and 20 wt.parts of naphthylene-1,5-diisocyanate was melt-kneaded by a mixing roll mill at 150° to 155° C. for 5 to 10 minutes. The kneaded mixture was taken out of the roll mill and was cooled and ground by a crusher to prepare an isocyanate batch in a flake form.

To 100 wt.parts of dried thermoplastic adipate type polyester polyurethane pellets, 30 wt.parts of said isocyanate batch was added and the mixture was well mixed in a tumbler and the mixture was melt-extruded by a Bent type extruder at 160° to 180° C. to prepare strands. The resulting strands were aged at 100° C. for 2 hours. The physical properties of the resulting strands were measured. The results are shown in Table 1.

As a reference, only thermoplastic adipate type polyester polyurethane was used under the same condition to prepare strands. The physical properties of the strands were also measured. The results are shown in Table 1.

TABLE 1

| | Example 1 | | |
|---|---|---|---|
| | Just after extrusion | After ageing for 2 hours at 100° C. | Reference |
| Solubility in dimethylformamide | soluble | insoluble | soluble |
| 100% modulus | unmeasurable | 48 | 27 |

TABLE 1-continued

| | Example 1 | | |
|---|---|---|---|
| Solubility in dimethylformamide | Just after extrusion soluble | After ageing for 2 hours at 100° C. insoluble | Reference soluble |
| (kg/cm²) Tensile strength (kg/cm²) | unmeasurable | 323 | 196 |
| Elongation (%) | unmeasurable | 500 | 645 |
| Shore A hardness | unmeasurable | 86 | 83 |

EXAMPLE 2

A mixture of 100 wt.parts of dried plasticized vinyl-chloride resin (plasticizer diethyl phthalate 50 PHR) and 40 wt.parts of hexamethylenediisocyanate trimer was melt-kneaded in a mixing roll mill at 150° to 155° C. for 5 to 10 minutes. The kneaded mixture was taken out of the roll mill and was cooled and ground by a crusher to prepare an isocyanate batch in a flake form. To 100 wt.parts of dried thermoplastic adipate type polyester polyurethane, 15 wt.parts of said isocyanate batch was added and the mixture was well mixed in a tumbler and the mixture was melt-extruded by a Bent type extruder at 160° to 180° C. to prepare strands. The resulting strands were aged at 100° C. for 2 hours. The physical properties of the resulting strands were measured. The results are shown in Table 2.

As a reference, only thermoplastic adipate type polyester polyurethane was used under the same condition to prepare strands. The physical properties of the strands were also measured. The results are shown in Table 2.

TABLE 2

| | Example 2 | | |
|---|---|---|---|
| Solubility in dimethylformamide | Just after extrusion soluble | After ageing for 2 hours at 100° C. insoluble | Reference soluble |
| 100% modulus (kg/cm²) | unmeasurable | 52 | 27 |
| Tensile strength (kg/cm²) | unmeasurable | 360 | 196 |
| Elongation (%) | unmeasurable | 480 | 645 |
| Shore A hardness | unmeasurable | 85 | 83 |

EXAMPLE 3

A mixture of 100 wt.parts of dried plasticized vinyl chloride resin (plasticizer dioctyl phthalate 40 PHR) and 30 wt.parts of 4,4'-diphenylmethanediisocyanate was mixed in Henschel mixer at 50°-100° C. for 5 to 10 minutes and the mixer was extruded through an extruder and was pelletized by a pelletizer to obtain an isocyanate batch in a form of pellets. To 100 wt.parts of dried thermoplastic adipate type polyester polyurethane, 20 wt.parts of said isocyanate batch was added and the mixture was well mixed in a tumbler and the mixture was melt-extruded by a Bent type extruder at 160° to 180° C. to prepare strands. The resulting strands were aged at 100° C. for 2 hours. The physical properties of the resulting strands were measured. The results are shown in Table 3.

As a reference, only thermoplastic adipate type polyester polyurethane was used under the same condition to prepare strands. The physical properties of the strands were also measured. The results are shown in Table 3.

TABLE 3

| | Example 3 | | |
|---|---|---|---|
| Solubility in dimethylformamide | Just after extrusion soluble | After ageing for 2 hours at 100° C. insoluble | Reference soluble |
| 100% modulus (kg/cm²) | unmeasurable | 45 | 27 |
| Tensile strength (kg/cm²) | unmeasurable | 320 | 196 |
| Elongation (%) | unmeasurable | 520 | 645 |
| Shore A hardness | unmeasurable | 85 | 83 |

EXAMPLE 4

A mixture of 70 wt.parts of dried polystyrene resin (Stylone 410:Asahi-Dow Chem. Co.) and 30 wt.parts of naphthylene-1,5-diisocyanate was melt-kneaded by Bunbury mixer at 180° to 190° C. for 5 to 7 minutes. The kneaded mixture was taken out of the Bunbury mixer and was cooled and ground by a crusher to prepare an isocyanate batch in a flake form.

To 100 wt.parts of thermoplastic adipate type polyester polyurethane pellets, 20 wt.parts of said isocyanate batch was added and the mixture was well mixed in a tumbler and the mixture was melt-extruded by a Bent type extruder at 160° to 180° C. to prepare strands. The resulting strands were aged at 100° C. for 2 hours. The physical properties of the resulting strands were measured. The results are shown in Table 4.

As a reference, only thermoplastic adipate type polyester polyurethane was used under the same condition to prepare strands. The physical properties of the strands were also measured. The results are shown in Table 4.

TABLE 4

| | Example 4 | | |
|---|---|---|---|
| Solubility in dimethylformamide | Just after extrusion soluble | After ageing for 2 hours at 100° C. insoluble | Reference soluble |
| 100% modulus (kg/cm²) | unmeasurable | 63 | 27 |
| Tensile strength (kg/cm²) | unmeasurable | 414 | 196 |
| Elongation (%) | unmeasurable | 540 | 645 |
| Shore A hardness | unmeasurable | 87 | 83 |

EXAMPLE 5

A mixture of 70 wt.parts of dried ABS resin (Tuflex 470:Mitsubishi Monsanto Chem. Co.) and 30 wt.parts of naphthylene-1,5-diisocyanate was melt-kneaded in a Bunbury mixer at 190° to 200° C. for 5 to 10 minutes. The kneaded mixture was taken out of the Bunbury mixer and was cooled and ground by a crusher to prepare an isocyanate batch in a flake form.

In accordance with the process of Example 4, strands were prepared by blending and extruding and physical properties of the resulting crosslinked polyurethane strands were measured together with the reference. The results are shown in Table 5.

TABLE 5

| Solubility in dimethylformamide | Example 5 | | |
| --- | --- | --- | --- |
| | Just after extrusion soluble | After ageing for 2 hours at 100° C. insoluble | Reference soluble |
| 100% modulus (kg/cm²) | unmeasurable | 50 | 27 |
| Tensile strength (kg/cm²) | unmeasurable | 380 | 196 |
| Elongation (%) | unmeasurable | 540 | 645 |
| Shore A hardness | unmeasurable | 87 | 83 |

We claim:

1. A process for preparing a thermosettable polyurethane product which comprises blending a compound having two or more terminal isocyanate groups with a thermoplastic resin which is inert to an isocyanate group to prepare an isocyanate compound batch and further blending the isocyanate compound batch with a thermoplastic polyurethane resin and fabricating the resulting mixture.

2. The process according to claim 1 wherein said fabrication is carried out by an extruder.

3. The process according to claim 1 wherein said fabrication is carried out by an injection molding machine or a rolling machine.

4. The process according to claim 1 wherein 5 to 100 wt.parts of said isocyanate compound is blended to 100 wt.parts of said thermoplastic resin to prepare an isocyanate compound batch.

5. The process according to claim 1 wherein an amount of said isocyanate compound batch is in a range of 1 to 100 wt.parts per 100 wt.parts of said thermoplastic polyurethane resin.

* * * * *